(12) United States Patent
Schneidewend et al.

(10) Patent No.: US 12,728,373 B2
(45) Date of Patent: Sep. 8, 2026

(54) WATER FILTER CARTRIDGE AND HEAD HAVING KEYED ENGAGEMENT

(71) Applicant: CULLIGAN INTERNATIONAL COMPANY, Rosemont, IL (US)

(72) Inventors: Tedd Schneidewend, Glen Ellyn, IL (US); Christopher Harris, Wilmette, IL (US); David West, Chicago, IL (US)

(73) Assignee: CULLIGAN INTERNATIONAL COMPANY, Rosemont, IL (US)

( * ) Notice: Subject to any disclaimer, the term of this patent is extended or adjusted under 35 U.S.C. 154(b) by 492 days.

(21) Appl. No.: 17/331,267

(22) Filed: May 26, 2021

(65) Prior Publication Data

US 2021/0379513 A1 Dec. 9, 2021

Related U.S. Application Data

(60) Provisional application No. 63/035,085, filed on Jun. 5, 2020.

(51) Int. Cl.
*B01D 35/30* (2006.01)
*B01D 29/11* (2006.01)
*B01D 35/153* (2006.01)

(52) U.S. Cl.
CPC ............ *B01D 35/306* (2013.01); *B01D 29/11* (2013.01); *B01D 35/153* (2013.01);
(Continued)

(58) Field of Classification Search
CPC .............. B01D 35/306; B01D 2201/29; B01D 2201/302; B01D 2201/303;
(Continued)

(56) References Cited

U.S. PATENT DOCUMENTS 3,746,171 A 7/1973 Thomsen
4,178,250 A 12/1979 Turetsky
(Continued)

FOREIGN PATENT DOCUMENTS

CN 101052451 A 10/2007
WO 2006/050114 A1 5/2006
(Continued)

OTHER PUBLICATIONS

WO 2012/086892 with English translation (Year: 2012).*
(Continued)

*Primary Examiner* — Benjamin M Kurtz
(74) *Attorney, Agent, or Firm* — Greer, Burns & Crain, Ltd

(57) ABSTRACT

A water filter assembly is provided, including a filter head including a filter manifold in fluid communication with an existing water line, a head housing connected to the manifold and including landings, an elongate key member depending from a portion of the filter head, and a filter cartridge including a filter housing constructed and arranged to retain a supply of filter media, a filter closure attached to an upper end of the filter housing and having at least an inlet port and an outlet port, the closure configured for engaging the landings of the head housing and also having a recess constructed and arranged to matingly and slidingly accommodate the key member so that, upon engaging the filter head, the filter cartridge is in alignment with the filter head.

17 Claims, 3 Drawing Sheets

(52) U.S. Cl.
CPC .... *B01D 2201/29* (2013.01); *B01D 2201/302* (2013.01); *B01D 2201/4053* (2013.01); *B01D 2201/4061* (2013.01); *B01D 2201/4092* (2013.01)

(58) Field of Classification Search
CPC .... B01D 2201/4046; B01D 2201/4053; B01D 2201/4061; B01D 2201/347
See application file for complete search history.

(56) References Cited

U.S. PATENT DOCUMENTS

| | | | | |
|---|---|---|---|---|
| 4,548,227 | A | 10/1985 | Regunathan et al. | |
| 4,645,601 | A | 2/1987 | Regunathan et al. | |
| 4,806,240 | A | 2/1989 | Giordano et al. | |
| 4,857,189 | A | 8/1989 | Thomsen et al. | |
| 4,915,831 | A | 4/1990 | Taylor | |
| 5,035,797 | A | 7/1991 | Janik | |
| RE34,031 | E | 8/1992 | Thomsen et al. | |
| 5,653,871 | A | 8/1997 | Thomsen | |
| 5,837,137 | A | 11/1998 | Janik | |
| 5,846,416 | A | 12/1998 | Gullett | |
| 6,048,455 | A | 4/2000 | Janik | |
| 6,458,269 | B1 | 10/2002 | Bassett et al. | |
| 6,949,189 | B2 | 9/2005 | Bassett et al. | |
| 7,135,113 | B2 | 11/2006 | Bassett et al. | |
| 7,135,114 | B2 | 11/2006 | Nonninger et al. | |
| 7,407,148 | B2 | 8/2008 | Bassett et al. | |
| 7,476,314 | B2 | 1/2009 | Reid | |
| 7,481,926 | B2 | 1/2009 | Dworatzek | |
| 7,837,876 | B2 | 11/2010 | Ye et al. | |
| 8,394,269 | B2 | 3/2013 | Wawrla et al. | |
| 8,932,463 | B2 | 1/2015 | Huber | |
| 9,868,081 | B1 * | 1/2018 | Zhang | C02F 1/001 |
| 10,005,010 | B2 | 6/2018 | Sann et al. | |
| 11,278,831 | B2 * | 3/2022 | Huang | B01D 35/306 |
| 2005/0023206 | A1 | 2/2005 | Fritze | |
| 2005/0252841 | A1 | 11/2005 | Bassett et al. | |
| 2006/0000754 | A1 | 1/2006 | Kang et al. | |
| 2006/0070942 | A1 * | 4/2006 | An | B01D 35/30<br>210/450 |
| 2006/0091047 | A1 * | 5/2006 | Ye | B01D 21/0012<br>210/234 |
| 2007/0284296 | A1 * | 12/2007 | Swain | C02F 9/20<br>210/235 |
| 2014/0202944 | A1 | 7/2014 | Wes | |
| 2017/0259195 | A1 * | 9/2017 | Mitchell | B01D 35/30 |
| 2018/0290083 | A1 | 10/2018 | Campbell | |
| 2018/0318739 | A1 * | 11/2018 | Park | B01D 35/30 |

FOREIGN PATENT DOCUMENTS

| | | | | | |
|---|---|---|---|---|---|
| WO | 2008/153253 | A1 | | 12/2008 | |
| WO | 2009/005499 | A1 | | 1/2009 | |
| WO | WO 2019/227855 | | * | 12/2019 | B01D 35/306 |

OTHER PUBLICATIONS

Zhu CN 105582720 (Year: 2016).*
Sun KR 102314723 (Year: 2021).*
Communication received for European Patent Application No. 21177603.4, dated Jan. 20, 2023.
Extended European Search Report received for Application No. 21177603.4, dated Sep. 23, 2021.

* cited by examiner 10
12
14
16
30
42
52
54
56
58
60
82

10
12
14
16
30
32
34
36
38
40
42
44
46
50
52
54
58
60
64
66
68
70
72
78
80
82

10
12
14
16
30
32
34
36
38
40
42
44
46
50
52
54
58
60
62
64
66
68
70
72
78
80
82

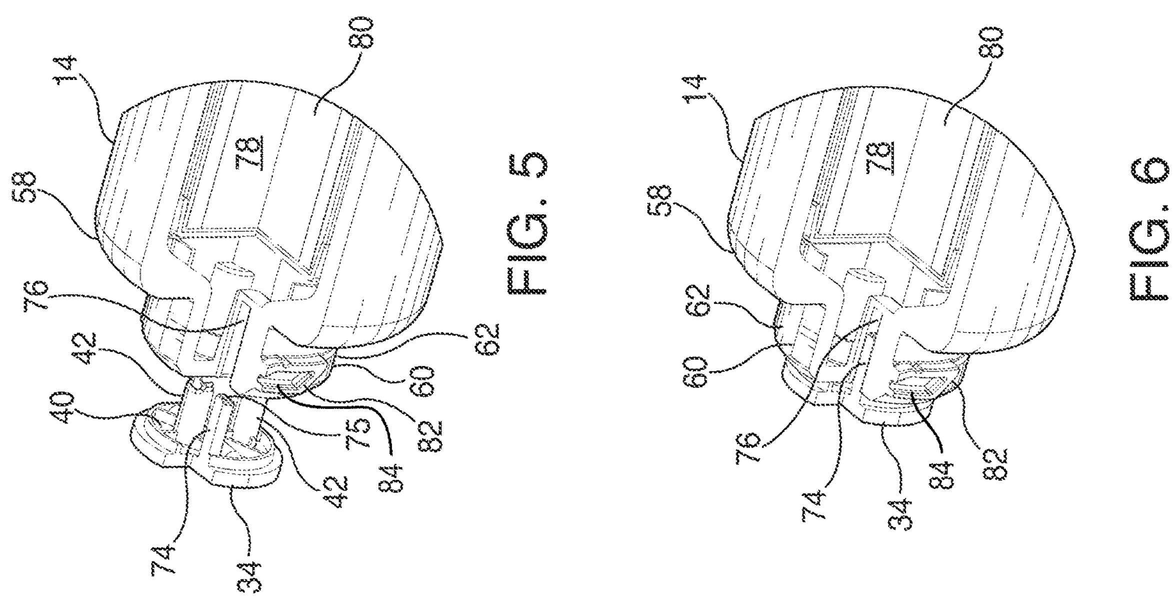
FIG. 5
FIG. 6
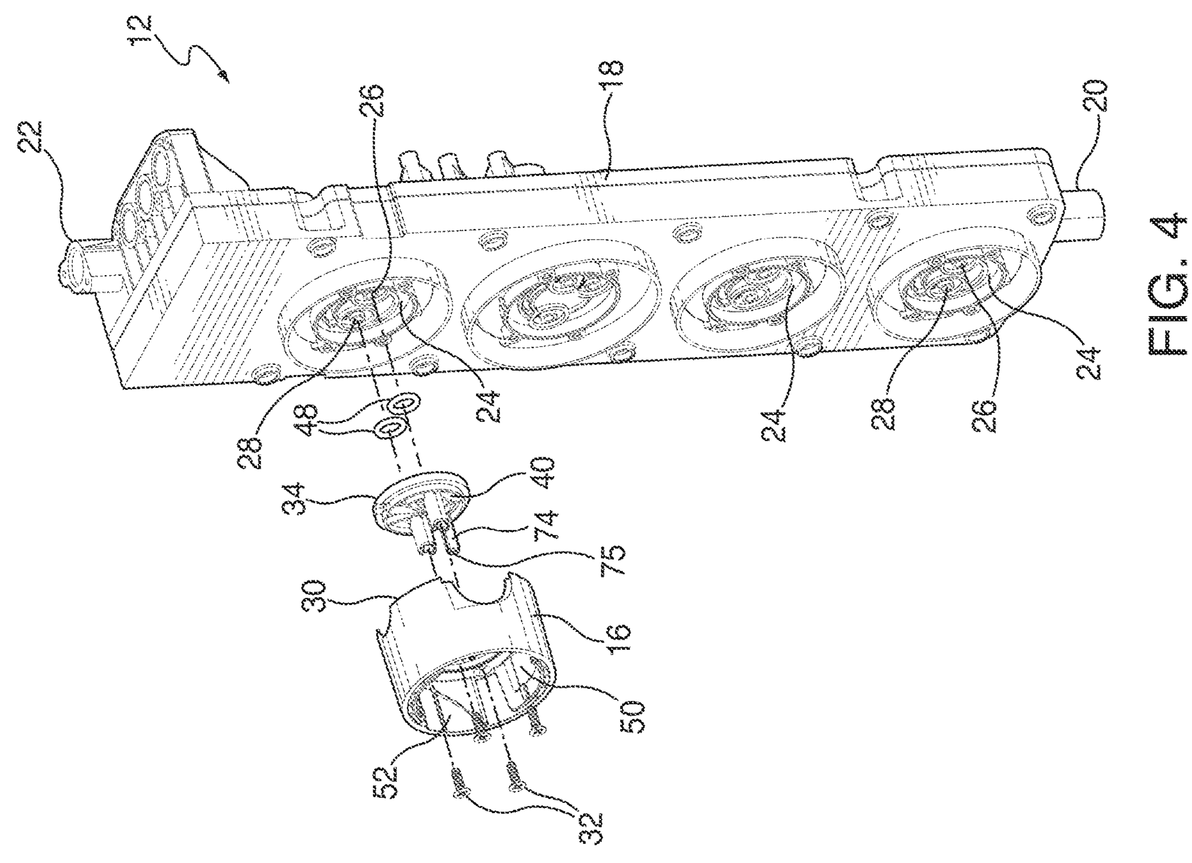
FIG. 4

WATER FILTER CARTRIDGE AND HEAD HAVING KEYED ENGAGEMENT

RELATED APPLICATION

This application is a Non-Provisional of, and claims 35 U.S.C. 119 priority from, U.S. Provisional Application No. 63/035,085 filed Jun. 5, 2020, the entire contents of which are incorporated by reference herein.

BACKGROUND

The present invention relates to a drinking water filter assembly including a filter head and a complementary replaceable disposable cartridge, and more particularly to such an assembly, as well as separate components which feature an improved keyed relationship.

Conventional filter assemblies include filter cartridges which house a filter media, such as activated carbon, membrane, resin, minerals or other known media, and a corresponding filter head designed to releasably and sealingly accommodate the filter cartridge and to couple the cartridge to an existing fluid flow line. outflow. It is common for filter cartridges to include input and output flow paths with openings at or near an upper end of the cartridge, also referred to as the filter cartridge closure. The flow paths communicate with the internal filter media, so that incoming water flows through the media in the cartridge is thus treated by removing unwanted substances, particles and properties, and then flows to the output opening, also known as the filter outlet.

Another feature of conventional water filter systems, is that since the cartridge needs periodic replacement, a mechanism is needed to prevent leakage while the spent cartridge is withdrawn, and a replacement installed. Often such systems are mounted in a cabinet below the kitchen sink in a residence. Accordingly, spillage in the cabinet should be avoided. Many conventional filter cartridges have internal shutoff valves, which are manually operated or automatically activated with the disconnection of the cartridge. However, a recurring problem of such systems is the deterioration of seals in the system, which cause irritating leaks over time as the system ages.

Another aspect of conventional water filter systems of this type, is that proper alignment of the filter cartridge into the head so that the filter inlet and outlet flow paths is achieved so that the paths in the cartridge are in proper alignment with similar passages in the filter head. Due to the common location of such systems in cabinets under the sink, or other hard to reach places, the positioning of the cartridge becomes awkward in the tight spaces under the sink. As such, an upper portion of the cartridge, as well as the fixed filter head, are often fitted with guide formations for facilitating proper engagement of the cartridge with the filter head.

A known approach to obtaining proper alignment between the filter cartridge and the head is to use a mating key and lock system, including mating respective formations on the head and cartridge which facilitate proper alignment and engagement between these components. Conventional water filter systems are known to have key and lock features which are easily broken or disabled by the user.

Thus, there exists a need of an improved filter assembly having a filter cartridge with a multiple fluid flow port closure, which addresses the design criteria discussed above.

SUMMARY

The above-listed need is met or exceeded by the present water filter cartridge and head having keyed engagement. Featured in the present apparatus is a replaceable cartridge having inlet and outlet ports in a filter closure, wherein each of the ports is provided with an associated check valve for preventing leaks during the cartridge exchange procedure. Each check valve is in a default closed position. The valves are opened when projections depending from the filter head engage each valve, overcoming the inherent closing spring biasing force. At the same time, these depending projections serve as the locating structure for the assembly, facilitating proper engagement between the filter head and the replaceable filter cartridge.

Another feature of the present assembly is that the filter head, and more specifically a bypass disk associated with the filter head, is provided with a water flow bypass conduit that is constructed and arranged to create a bypass flow path in the filter head as the cartridge is replaced. When the bypass flow is connected, the head is prevented from leaking during cartridge replacement.

This feature is achieved by the user rotating the cartridge 90° to move from an operational or open position to a replacement or bypass position. The bypass disk is rotatably associated with the filter head, and includes a bypass flow conduit segment. Also, the bypass disk includes formations, preferably the projections, that engage the inlet and outlet ports of the cartridge, so the bypass disk rotates relative to the filter head with the cartridge. The engagement of the projections with the cartridge ports form the fluid connection between the cartridge and the filter head. As the cartridge and bypass disk are rotated prior to cartridge removal, the bypass flow conduit on the bypass disk becomes connected between the inlet and outlet flow paths of the filter head manifold. In other words, the bypass disk rotates between an operational, open or flow position where water is directed to and from the cartridge, and a bypass position, which occurs after rotation of the cartridge for removal, where the water flow totally bypasses the cartridge. Once the filter cartridge and the bypass disk are in the removal or bypass position, the cartridge is removable through features on the filter head which eject the cartridge though an angled interference between the filter and filter head. The user is then able to axially pull the cartridge to disengage the cartridge from the overall system without interference from the force of the seals holding the cartridge to the system. A replacement cartridge is connected to the filter head by reversing the above procedure.

Accordingly, the present filter head does not require an associated shutoff valve. A related advantage of the configuration of the present filter head is that the filter head is thus in condition for periodic cleaning of the flow passages by service personnel. Because all positions on the system can be bypassed, cleaning solution can be easily added to the first filter position through use of an empty, fillable sanitizing cartridge. To perform this process, the sanitizing cartridge is filled with cleaning solution and inserted to the first filter position. Water with cleaning solution is then passed through the whole system without the use of individual bypass components that would otherwise need to be provided and installed by the service personnel.

More specifically, a water filter assembly, is provided, including a filter head including a filter manifold in fluid communication with an existing water line, a head housing connected to the manifold and including landings, an elongate key member depending from a portion of the filter head, and a filter cartridge including a filter housing constructed and arranged to retain a supply of filter media, a filter closure attached to an upper end of the filter housing and having at least an inlet port and an outlet port, the closure configured for engaging the landings of the head housing and also having a recess constructed and arranged to matingly and slidingly accommodate the key member so that, upon engaging the filter head, the filter cartridge is in alignment with the filter head.

In another embodiment, a filter cartridge is provided for use with a filter assembly including a filter head having a filter manifold in fluid communication with an existing water line, a head housing connected to the manifold and including landings, and a key member depending from the head, wherein a fluid inlet connected to the water line is directly connected to a fluid outlet in the manifold, the cartridge including a filter housing constructed and arranged to retain a supply of filter media; a filter closure attached to an upper end of the filter housing and having at least an inlet port and an outlet port, the closure configured for engaging the landings of the head housing, and also having a recess for slidingly and matingly accommodating the key member for facilitating engagement between the filter head and the cartridge.

In still another embodiment, a filter head is provided for use in a filter assembly including the head and a replaceable cartridge having a filter housing constructed and arranged to retain a supply of filter media, a filter closure attached to an upper end of the filter housing, having at least an inlet port and an outlet port, and a recess, the filter head including a filter manifold in fluid communication with an existing water line, a head housing connected to the manifold and including landings; and a pair of depending projections. A key member depends from the head housing and being constructed and arranged for engaging the recess on the filter cartridge for facilitating alignment between the filter head and the cartridge.

In an embodiment, the bypass disk is provided with depending projections constructed and arranged for engaging each of the inlet port and the outlet port, such that upon engagement of the projections in the ports and rotation of the cartridge relative to the filter head, the bypass disk rotates with the cartridge. In an embodiment, a check valve is located in each of the inlet port and the outlet port of the cartridge closure, each the check valve being disposed in the cartridge closure so that engagement of the projections into the ports upon connection of the filter causes the check valves to move from a biased, closed position, to an open position.

In an embodiment, seal elements are disposed between the bypass disk and the manifold for defining a sealed, rotating engagement. Also, in an embodiment, filter cartridge closure has at least one radially projecting lug constructed and engaged for engaging said landings on said filter manifold head. In an embodiment, when said bypass disk is in said open position, water flow is directed from said filter head into said filter cartridge inlet port, and water flow from said filter cartridge outlet port is directed to an outlet port of said filter head manifold. In an embodiment, the filter head, and more preferably, bypass disk is provided with a longitudinally extending key member that is constructed and arranged to matingly engage a recess on the filter cartridge closure.

In another embodiment, a filter cartridge is provided for use with a filter assembly including a filter head having a filter manifold in fluid communication with an existing water line, a head housing connected to the manifold and including landings, and a bypass disk rotatably engaged in the head housing to be in connection with the filter head manifold between an open position and a bypass position, wherein a fluid inlet connected to the water line is directly connected to a fluid outlet in the manifold. The cartridge includes a filter housing constructed and arranged to retain a supply of filter media, a filter closure attached to an upper end of the filter housing and having at least an inlet port and an outlet port, the closure configured for engaging landings of the head housing, and also for engaging the bypass disk so that, upon engaging the filter head, the filter cartridge rotates the bypass disk between the open and the bypass positions.

In an embodiment, each inlet port and outlet port is equipped with a check valve biased to a closed position. Any optional ports are also provided with such a check valve. Also, in an embodiment, each inlet port and outlet port is provided with at least one seal structure, and an opening defined by the seal structure is dimensioned for slidingly and sealingly engaging a selected one of the projections of the bypass disk. Also, it is preferred that the closure is provided with at least one radially projecting lug for engaging the landings of the filter head housing. In an embodiment, at least one radially projecting lug defines a polygonally-shaped thread track. Further, the filter cartridge closure is provided with a recess constructed and arranged to accommodate a longitudinally projecting key member extending from the filter head, and more preferably, from the bypass disk.

In yet another embodiment, a filter head is provided for use in a filter assembly including the head and a replaceable cartridge having a filter housing constructed and arranged to retain a supply of filter media, a filter closure attached to an upper end of the filter housing and having an inlet port and an outlet port. The filter head includes a filter manifold in fluid communication with an existing water line, a head housing connected to said manifold and including landings and a bypass disk having a pair of depending projections and a bypass conduit, the bypass disk being rotatably engaged in the head housing to be in connection with the filter head manifold between an open position and a bypass position. The projections on the bypass disk are configured for engaging the inlet and outlet ports of the filter cartridge and also for opening respective check valves in each port to enable water flow between the filter head and the cartridge upon engagement of the cartridge with the filter head, the bypass disk becoming connected to the filter cartridge closure, so that rotation of the filter cartridge also rotates the bypass disk between an open or operational position, and a bypass position. Another feature of the filter head is a longitudinally extending key member that is constructed and arranged to matingly engage a recess on the filter cartridge closure. In the preferred embodiment, the key member extends from an underside of the bypass disk.

In an embodiment, the bypass disk includes a disk body, the projections project from an underside of disk body, and bypass conduit is disposed on an upper surface of the disk body. In an embodiment, the projections are in spaced, parallel relationship to each other. Also, preferably included are sealing members disposed between the bypass disk and the manifold for sealing the bypass disk during the rotation between the open and the bypass positions.

BRIEF DESCRIPTION OF THE DRAWINGS

FIG. 4 is an exploded perspective view of the present filter head;

FIG. 5 is a fragmentary exploded perspective view in partial section of the present cartridge becoming engaged on the bypass disk;

FIG. 6 is a fragmentary perspective view in partial section showing the present cartridge engaged on the bypass disk;

DETAILED DESCRIPTION

Figures 1, 2, 3:
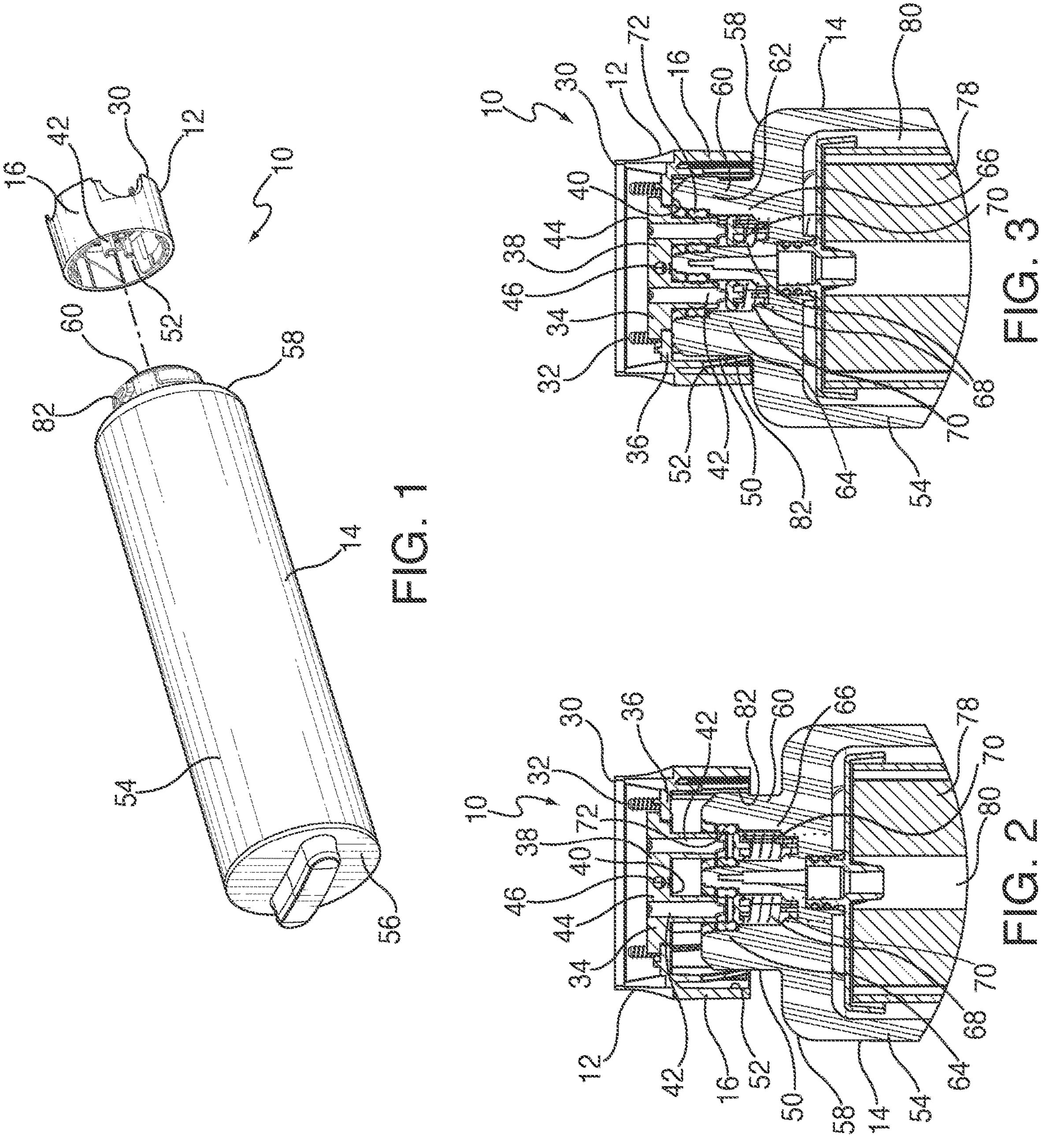
FIG. 1 is a rear exploded perspective view of the present filter cartridge and filter head housing.
FIG. 2 is a fragmentary vertical cross-section of the present filter cartridge engaged in the filter head in a filter check valve closed position, occurring during cartridge installation and removal.
FIG. 3 is a fragmentary vertical cross-section of the present filter cartridge engaged in the filter head in a filter check valve open or operational position, wherein water flows between the filter head and the filter cartridge.
Figures 7, 8A, 8B, 8C, 8D:
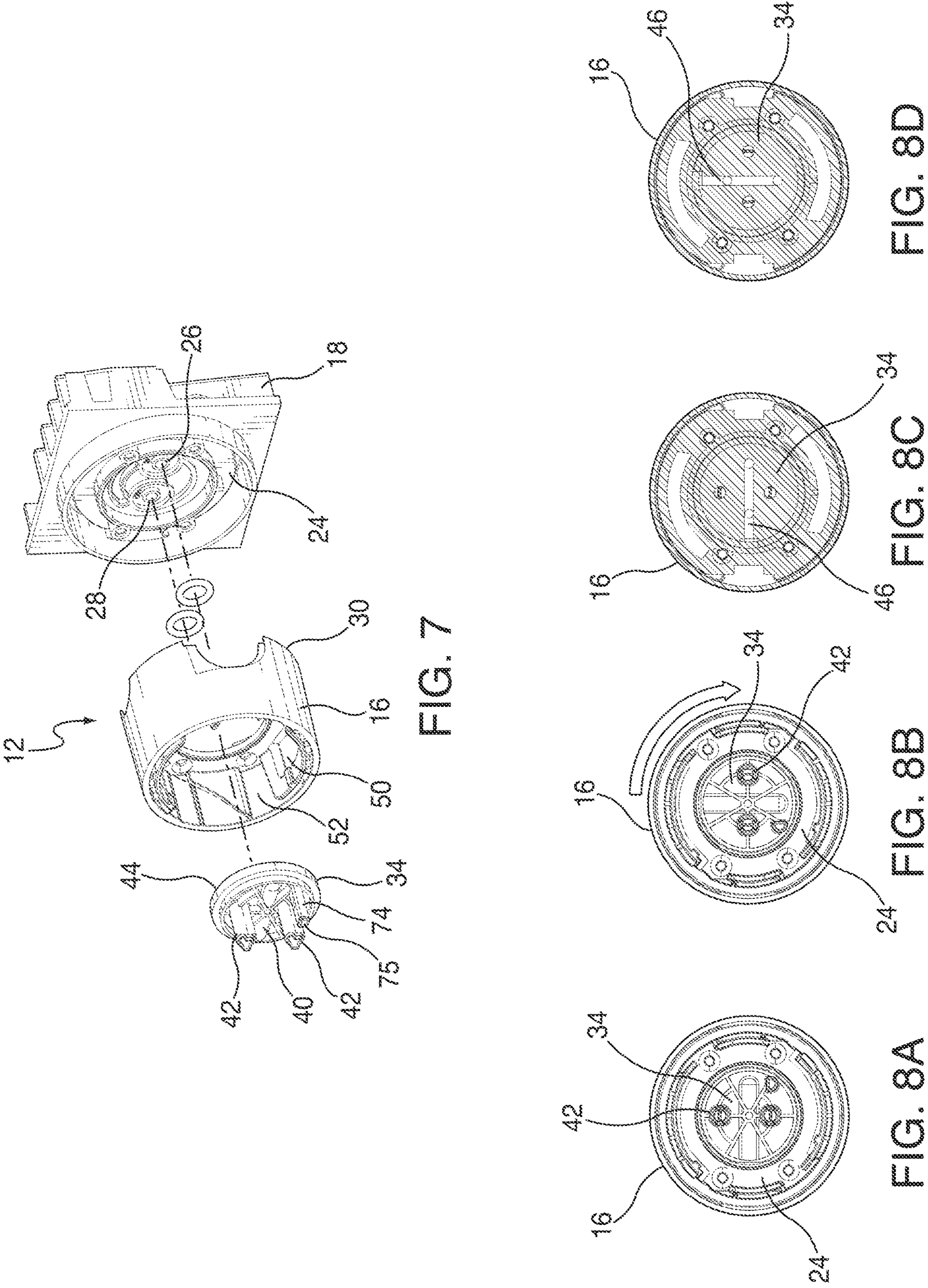
FIG. 7 is a fragmentary exploded perspective view of the present filter head.
FIG. 8A is a bottom view of the present filter head in the bypass position.
FIG. 8B is a bottom view of the present filter head in the operational or open position.
FIG. 8C is a top view of the present bypass disk in the bypass position.
FIG. 8D is a top view of the present bypass disk in the operational or open position.

Referring now to FIGS. 1, 4 and 7, a filter assembly, generally designated as 10, includes a filter head 12 and a filter cartridge 14. The filter head 12, preferably made of molded plastic, has a generally cylindrical, inverted cup-like housing portion 16 constructed and arranged for connection to a manifold 18 (FIGS. 4 and 7), which, in the present assembly 10, is considered part of the filter head. The manifold 18 is preferably configured for accommodating at least one, and preferably a plurality of filter cartridges 14, and has a water inlet connection 20 and a water outlet connection 22 (FIG. 4) for connection to an existing water line in a residence or commercial building, as is known in the art. As such, the manifold 18 has at least one connection point 24 provided with two connection ports, respectively designated an inlet connection port 26 and an outlet connection port 28. The head housing 16 has an upper end 30 configured for attachment in the connection point 24, as by being threaded or using fasteners 32 (FIGS. 2-4), as is well known in the art.

Referring now to FIGS. 2-4, in attaching the head housing 16 to the manifold connection point 24, the head housing captures a bypass disk 34 for rotation relative to the head housing. A circular flange or ring 36 on the head housing 16 captures the bypass disk 34. Included on the bypass disk 34 is a main disk body 38 having an underside 40 from which project a pair of spaced, parallel, hollow projections 42. Below an upper side 44, in the disk body 38, a bypass conduit 46 is configured for connecting internal inlet and outlet water lines (not shown) of the manifold 18. Also included in the filter head 12 is at least one and preferably a pair of sealing elements 48 (FIG. 4), preferably O-rings or the like, which are sandwiched between the bypass disk 34 and the connection point 24 for sealing the bypass disk and preventing leaks as the disk rotates. In other words, the elements 48 define a sealed, rotating engagement.

As will be described in greater detail below, the projections 42 are hollow and define a fluid connection path between the filter cartridge 14 and the filter head 12, more specifically, the connection ports 26, 28 of the manifold 18. Another feature of the head housing 16 is at least one and preferably a plurality of landings 50 on an inside wall surface 52. In a preferred embodiment, and while alternatives are contemplated, the landings 50 define a generally helical path in the head housing 16.

Referring now to FIGS. 1-3, 5 and 6, the filter cartridge 14, includes a pressure vessel 54, which may be made of metal or plastic, having a closed lower end 56 and an upper end 58. A closure member 60 seals the upper end 58, and in the preferred embodiment is integrally formed with the pressure vessel 54. Defined by the closure member 60 is a diametrically smaller neck 62 which is dimensioned to be inserted within the head housing 16. Included on the closure member 60 is an inlet port 64 and an outlet port 66. Each of the ports 64, 66 is recessed into the closure member 60, and is also each provided with a check valve 68 biased into a closed position by a spring 70. In addition, each of the ports 64, 66 is provided with internal sealing members 72 such as O-rings, lip seals or the like. It is contemplated that the closure member 60 is optionally provided with additional ports, depending on the functionality of the filter cartridge 14. Any such additional ports preferably are configured like the ports 64, 66.

Each check valve 68 is disposed in the cartridge closure 60 so that engagement of the projections 42 from the bypass disk 34 into the inlet and outlet ports 64, 66 upon connection of the filter cartridge 14 to the filter head 12 causes the check valve to move from a biased, closed position, to an open position. Each of the inlet port 64 and the outlet port 66 is provided with at least one seal element 72 (FIGS. 2 and 3) such as an O-ring, and an opening defined by each such seal element is dimensioned for slidingly and sealingly engaging a selected one of the projections 42 of the bypass disk 34.

Another feature of the present filter system 10 is that the engagement between the projections 42 and the inlet and outlet ports 64, 66 facilitates proper engagement and alignment of the filter cartridge 14 with the filter head 12. As such, the projections 42 perform a key function, in addition to being the fluid communication conduit between the filter cartridge 14 and the filter head 12.

In a preferred embodiment, the bypass disk 34 includes a fixed, longitudinally extending key member 74 which is constructed and arranged to matingly engage a recess 76 (FIGS. 5 and 6) in the closure 60 of the cartridge 14. The engagement between the key member 74 and the recess 76 further confirms proper alignment and engagement between the filter cartridge 14 and the filter head 12. While other configurations are contemplated, the key member 74 has a rectangular transverse cross-section (FIG. 7), or alternately has a "D"-shaped cross-section (FIG. 8B). Also, the key member 74 preferably has a length that is generally equal to that of the projections 42. Further, a tip 75 of the key member 74 is tapered or rounded to facilitate sliding engagement with the recess 76. In addition, when viewed from the underside 40 of the bypass disk 34, the key member 74 and the two projections 42 form a triangle. It is further preferred that the key member 74 is closer to one of the projections than the other. (FIGS. 7 and 8B).

Referring now to FIGS. 8A-8D, also, upon engagement of the projections 42 in the ports 64, 66 and rotation of the cartridge 14 relative to the filter head 12, the bypass disk 34 rotates with the cartridge relative to the head housing 16 between an open position (FIGS. 8B and 8D) and a bypass position (FIGS. 8A and 8C). When the bypass disk 34 is in the open position, water flow is directed from the filter head 12 into the filter cartridge inlet port 64, and water flow from the filter cartridge outlet port 66 is directed to an outlet port of the filter head manifold 18.

As is well known in the filter cartridge art, a filter media 78, such as activated carbon, carbon block, filaments or the like, is located in a main cartridge chamber 80. Water flows through the inlet port 64 into the chamber 80, and is passed through the media 78, after which it is conveyed to the outlet port 66 after being treated by the media to remove unwanted particulates, taste, chlorine, and the like, also as is known in the art. When the bypass disk 34 is in the open or operational position, water flowing into the manifold 18 is conducted to the filter cartridge 14 for passage through the filter media 74.

After a period of time, the filter cartridge filter media 78 loses its filtration capacity, and the cartridge 14 needs replacement. As described above, conventional water filter systems employ manual or automatic check valves for shutting off the flow of water from the manifold 18 to the filter cartridge 14. However, in the present filter system 10, the bypass disk 34 is provided with the bypass conduit 46, and no separate head shut off valve is needed. As the cartridge 14 is rotated 90° relative to the head housing 16, the bypass conduit 46 is placed in fluid communication with the inner flow lines of the manifold 18, connecting the preferably internal water inlet with the water outlet conduit of the manifold.

Once the bypass disk 34 is in the bypass position, the cartridge 14 is removable, since radially extending lugs 82 on the closure 60 are now disengaged from the landings 50 on the inside wall surface 52 of the head housing 16, allowing the cartridge to be pulled from the filter head 12 for replacement. As the cartridge 14 is withdrawn from the filter head 12, once the projections 42 are disengaged from the check valves 68, the check valves are biased to the closed position, preventing the cartridge 14 from leaking while being replaced.

Referring now to FIGS. 5 and 6, the use of the radially extending lugs 82 for engaging the landings 50 on the head housing 16 for retaining the cartridge 14 in the head housing is well known in the filter cartridge art. In the present system 10, in one embodiment, the lugs 82 are constructed and arranged so that at least one such lug defines a polygonally-shaped thread track 84 (FIGS. 5 and 6).

While a particular embodiment of the present water filter cartridge and head having keyed engagement has been described herein, it will be appreciated by those skilled in the art that changes and modifications may be made thereto without departing from the invention in its broader aspects and as set forth in the following claims.

The invention claimed is:

1. A water filter assembly, comprising:

a filter head including a filter manifold in fluid communication with an existing water line, a head housing connected to said manifold and including landings and a bypass disk that rotates relative to said head housing, said bypass disk including a pair of hollow projections and an elongate key member, wherein said pair of hollow projections and said elongate key member depend from said bypass disk; and a filter cartridge including a filter housing constructed and arranged to retain a supply of filter media, a filter closure attached to an upper end of said filter housing and having an upper surface from which are recessed at least an inlet port and an outlet port which are constructed and arranged to matingly and slidingly accommodate said hollow depending projections of said bypass disk, said inlet port and said outlet port each including at least one internal sealing member, said closure configured for engaging said landings of said head housing and also having a recess depending from said upper surface and constructed and arranged to matingly and slidingly accommodate said elongate key member so that, upon engaging said filter head, said filter cartridge is in alignment with said filter head;

wherein said inlet port and said outlet port are radially displaced from a center of said upper surface and wherein said bypass disk includes a bypass conduit, such that when said bypass disk is in a bypass position, said bypass conduit is placed in fluid communication with the inner flow lines of the manifold, and wherein said bypass conduit is disposed below a flat upper surface within a disk body of said bypass disk which is parallel to said upper surface of said filter closure such that said flat upper surface extends directly above said bypass conduit, and said depending hollow projections extend through said flat upper surface of said disk body, such that said depending hollow projections end at said flat upper surface.

2. The filter assembly of claim 1, further including a check valve located in each of said inlet port and said outlet port of said cartridge closure, each said check valve being disposed in said cartridge closure below said upper surface so that engagement of said projections into said ports upon connection of said filter causes said check valves to move from a biased, closed position, to an open position, wherein said check valve is biased into the closed position by a spring.

3. The filter assembly of claim 1, wherein at least one of:

said key member has a rectangular transverse cross-section;

said key member has a tapered or rounded tip; and said key member has a "D"-shaped transverse cross-section.

4. The filter assembly of claim 1, wherein said filter cartridge closure has at least one radially projecting lug constructed and arranged for engaging said landings on said filter manifold head.

5. The filter assembly of claim 1, wherein said key has a curved exterior surface, and said recess has a corresponding curved inner surface, and wherein said projections having generally the same length as said key member.

6. The filter assembly of claim 1, wherein at least one of:

said projections are in spaced, parallel relationship to each other and form a triangle with said key member, and the filter head further comprises at least one sealing element which is disposed between a flat upper surface of said bypass disk and a connection point on the filter manifold.

7. The filter assembly of claim 1, wherein said bypass conduit passes through the center of said upper surface, and wherein an axis of an opening of each said depending hollow projection at said flat upper surface is parallel to an axis of the filter cartridge.

8. A filter cartridge for use with a filter assembly including a filter head having a filter manifold in fluid communication with an existing water line, a head housing connected to the manifold and including landings and a bypass disk that rotates relative to the head housing, the bypass disk including a pair of hollow projections and a key member, wherein the pair of hollow projections and the elongate key member depend from the bypass disk, wherein the bypass disk includes a bypass conduit, such that when the bypass disk is in a bypass position, the bypass conduit is placed in fluid communication with the inner flow lines of the manifold, and wherein a fluid inlet connected to the water line is directly connected to a fluid outlet in the manifold, said cartridge comprising:

a filter housing constructed and arranged to retain a supply of filter media; and a filter closure permanently affixed to, or integral with, an upper end of said filter housing and having an upper surface which is configured for contacting engagement with the bypass disk and from which are recessed at least an inlet port and an outlet port which are constructed an arranged to matingly and slidingly accommodate the hollow depending projections of the bypass disk, said closure configured for engaging the landings of the head housing, and also having a recess depending from said upper surface for slidingly and matingly accommodating the elongate key member for facilitating engagement between the filter head and said cartridge;

wherein said inlet port and said outlet port each include at least one internal sealing member, wherein said inlet port and said outlet port are radially displaced from a center of said upper surface, and wherein said inlet port and said outlet port are in spaced, parallel relationship to each other and form a triangle with said recess, and wherein each said inlet port and said outlet port is equipped with a check valve biased to a closed position, such that said check valve is biased into the closed position by a spring and said check valve contacts said at least one internal sealing member when said check valve is in the closed position.

9. The filter cartridge of claim 8, wherein said closure is provided with at least one radially projecting lug for engaging the landings of the filter head housing.

10. The filter cartridge of claim 9, wherein said at least one radially projecting lug defines a polygonally-shaped thread track.

11. The filter cartridge of claim 8, wherein said recess has:

a curved inner surface for receiving said key which has a curved exterior surface, and a flat inner surface which connects ends of said curved inner surface.

12. The filter cartridge of claim 8, wherein each of said at least one internal sealing member defines an opening that is dimensioned for slidingly and sealingly engaging one of the depending hollow projections.

13. The filter cartridge of claim 8, wherein said inlet port and said outlet port each include an indentation for housing said at least one internal sealing member, such that a depth of said indentations is less than a thickness of said at least one internal sealing member.

14. A filter head for use in a filter assembly including said head and a replaceable cartridge having a filter housing constructed and arranged to retain a supply of filter media, a filter closure attached to an upper end of the filter housing, having an upper surface from which are recessed at least an inlet port and an outlet port, and a recess depending from the upper surface, said filter head comprising:

a filter manifold in fluid communication with an existing water line;

a head housing connected to said manifold and including landings and a bypass disk that rotates relative to said head housing, said bypass disk including a pair of depending hollow projections extending away from said filter manifold, wherein said depending hollow projections are radially displaced from a center of said bypass disk; and a key member depending from said bypass disk and being constructed and arranged for engaging the recess on the filter cartridge for facilitating alignment between said filter head and the cartridge;

wherein said bypass disk includes a bypass conduit, such that when said bypass disk is in a bypass position, said bypass conduit is placed in fluid communication with the inner flow lines of the manifold, wherein said bypass conduit is disposed below a flat upper surface within a disk body of said bypass disk which is transverse to a longitudinal axis of said head housing such that said flat upper surface extends directly above said bypass conduit, and said depending hollow projections extend through said flat upper surface of said disk body, such that said depending hollow projections end at said flat upper surface, and wherein the inlet port and the outlet port each include at least one internal sealing member which define openings that are dimensioned for slidingly and sealingly engaging said depending hollow projections.

15. The filter head of claim 14, wherein said depending hollow projections are in spaced, parallel relationship to each other and form a triangle with said key member.

16. The filter head of claim 14, wherein at least one of:

said key member is closer to one of said depending hollow projections than the other, and said key member has one of a rectangular and a “D”-shaped transverse cross-section.

17. The filter head of claim 14, wherein said recess has a curved inner surface which corresponds to a curved exterior surface of the key member.

* * * * *